US011556328B2

(12) United States Patent
Willis et al.

(10) Patent No.: US 11,556,328 B2
(45) Date of Patent: *Jan. 17, 2023

(54) METHOD AND SYSTEM FOR CONTROLLING SOFTWARE UPDATES ON A NETWORK CONNECTED DEVICE

(71) Applicant: BlackBerry Limited, Waterloo (CA)

(72) Inventors: Edward Snow Willis, Ottawa (CA); Hashim Mohammad Qaderi, Kitchener (CA); Scott Hutchens, Ottawa (CA); David Alan Inglis, Stittsville (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/991,369

(22) Filed: Aug. 12, 2020

(65) Prior Publication Data

US 2020/0371775 A1   Nov. 26, 2020

Related U.S. Application Data

(63) Continuation of application No. 15/869,868, filed on Jan. 12, 2018, now Pat. No. 10,776,096.

(51) Int. Cl.
*G06F 8/65* (2018.01)
*H04L 67/00* (2022.01)
(Continued)

(52) U.S. Cl.
CPC ............... *G06F 8/65* (2013.01); *H04L 63/083* (2013.01); *H04L 67/34* (2013.01); *H04W 76/10* (2018.02); *H04W 84/042* (2013.01)

(58) Field of Classification Search
CPC ......... G06F 8/65; H04L 63/083; H04L 67/34; H04W 76/10; H04W 84/042
See application file for complete search history.

(56) References Cited

U.S. PATENT DOCUMENTS 8,731,155 B2 *  5/2014  Chesnutt ................ G08C 17/02
                                            379/207.02
9,894,066 B2 *  2/2018  Conrad .................... H04L 67/34
(Continued)

OTHER PUBLICATIONS

European Patent Office, Examination Report for Application No. 19150593.2, dated Sep. 23, 2020.
(Continued)

*Primary Examiner* — Matthew J Brophy
(74) *Attorney, Agent, or Firm* — Moffat & Co

(57) ABSTRACT

A method at a computing device acting as a switchboard between an electronic device and a device to be updated, the method including receiving, at the computing device, a connection request from the electronic device, the connection request including an identifier for the device to be updated; receiving, at the computing device, a connection request from the device to be updated; associating, at the computing device, the connection request from the electronic device and the connection request from the device to be updated; forwarding, at the computing device, a message from the device to be updated to the electronic device that update conditions have been met; forwarding, at the computing device, a message from the electronic device to the device to be updated to start an update process; and forwarding, at the computing device, update status information from the device to be updated to the electronic device.

17 Claims, 5 Drawing Sheets

(51) Int. Cl.
  *H04W 76/10* (2018.01)
  *H04L 9/40* (2022.01)
  *H04W 84/04* (2009.01)

(56) References Cited

U.S. PATENT DOCUMENTS

| | | | | |
|---|---|---|---|---|
| 9,916,151 | B2* | 3/2018 | Ye | H04W 12/10 |
| 9,946,531 | B1* | 4/2018 | Fields | B60W 50/02 |
| 10,469,599 | B2* | 11/2019 | Yoden | H04B 1/3827 |
| 10,776,096 | B2* | 9/2020 | Willis | H04W 76/10 |
| 2004/0039500 | A1 | 2/2004 | Amendola et al. | |
| 2006/0161314 | A1* | 7/2006 | Honmura | G06F 8/656 |
| | | | | 701/1 |
| 2008/0039008 | A1* | 2/2008 | Chen | H04L 67/34 |
| | | | | 455/3.01 |
| 2009/0222497 | A1 | 9/2009 | Ryan | |
| 2010/0333081 | A1* | 12/2010 | Etchegoyen | G06F 8/60 |
| | | | | 717/172 |
| 2011/0273279 | A1* | 11/2011 | Vandivier | H04L 67/12 |
| | | | | 701/469 |
| 2014/0325500 | A1* | 10/2014 | Jang | G06F 8/65 |
| | | | | 717/173 |
| 2015/0019856 | A1* | 1/2015 | Kim | G06F 21/575 |
| | | | | 713/1 |
| 2015/0040120 | A1* | 2/2015 | Bocking | G06F 8/61 |
| | | | | 717/178 |
| 2015/0221152 | A1* | 8/2015 | Andersen | G07C 9/27 |
| | | | | 340/5.22 |
| 2015/0230044 | A1* | 8/2015 | Paun | H04L 67/12 |
| | | | | 455/41.2 |
| 2015/0339114 | A1* | 11/2015 | Rockwell | G06F 8/65 |
| | | | | 701/1 |
| 2015/0347121 | A1* | 12/2015 | Harumoto | H04L 67/12 |
| | | | | 717/172 |
| 2016/0036788 | A1* | 2/2016 | Conrad | H04W 12/06 |
| | | | | 713/168 |
| 2016/0036814 | A1* | 2/2016 | Conrad | H04L 9/0891 |
| | | | | 713/171 |
| 2016/0036956 | A1* | 2/2016 | Debates | G06F 16/951 |
| | | | | 455/419 |
| 2016/0117162 | A1* | 4/2016 | Searle | H04L 41/40 |
| | | | | 717/173 |
| 2016/0147525 | A1* | 5/2016 | Choi | G06F 8/65 |
| | | | | 717/173 |
| 2016/0196131 | A1* | 7/2016 | Searle | H04L 65/40 |
| | | | | 717/173 |
| 2016/0196132 | A1* | 7/2016 | Searle | H04L 9/40 |
| | | | | 717/173 |
| 2016/0266866 | A1 | 9/2016 | Sarkar et al. | |
| 2016/0291940 | A1* | 10/2016 | Searle | H04L 67/303 |
| 2016/0291959 | A1* | 10/2016 | Searle | H04L 41/082 |
| 2016/0294605 | A1* | 10/2016 | Searle | H04L 41/069 |
| 2016/0294614 | A1* | 10/2016 | Searle | H04L 67/34 |
| 2016/0371075 | A1* | 12/2016 | Moeller | H04L 67/12 |
| 2016/0371077 | A1* | 12/2016 | Moeller | G06F 8/654 |
| 2017/0060559 | A1* | 3/2017 | Ye | G06F 8/65 |
| 2017/0092018 | A1* | 3/2017 | Throop | G07C 5/008 |
| 2017/0262277 | A1* | 9/2017 | Endo | H04L 67/04 |
| 2018/0024826 | A1* | 1/2018 | Caushi | G06F 8/65 |
| | | | | 717/172 |
| 2018/0048473 | A1* | 2/2018 | Miller | H04L 9/30 |
| 2018/0052681 | A1* | 2/2018 | Pereira Cabral | G06F 8/65 |
| 2018/0074811 | A1* | 3/2018 | Kiyama | H04L 67/59 |
| 2018/0189049 | A1* | 7/2018 | Madrid | G06F 21/575 |
| 2019/0155594 | A1* | 5/2019 | Nakaguma | G06F 9/445 |
| 2019/0325666 | A1* | 10/2019 | Teraoka | G07C 5/0808 |
| 2020/0125355 | A1* | 4/2020 | Aust | G06F 8/65 |
| 2020/0177561 | A1* | 6/2020 | Kruger | H04W 12/35 |
| 2021/0157566 | A1* | 5/2021 | Sakurai | G06F 3/0659 |
| 2021/0405604 | A1* | 12/2021 | Fox | G06F 8/658 |

OTHER PUBLICATIONS

European Patent Office, Extended European Search Report for Application No. 19150593.2, dated Jun. 3, 2019.
European Patent Office, Examination Report for Application No. 19150593.2, dated Apr. 4, 2022.

* cited by examiner

METHOD AND SYSTEM FOR CONTROLLING SOFTWARE UPDATES ON A NETWORK CONNECTED DEVICE

FIELD OF THE DISCLOSURE

The present disclosure relates to over-the-air updates for network connected devices, and in particular relates to the over-the-air updates for network connected devices having no feedback mechanism.

BACKGROUND

Network connected devices often contain software that occasionally needs to be updated. For example, in vehicles, an electronic control unit (ECU) controls a system or subsystem of the vehicle, and may occasionally need firmware or software updates.

However, in many cases, such network connected devices may not have a graphical user interface to provide for the initiation of an update, nor is there any mechanism to provide feedback as to the status of an update.

Further, in many cases, it is undesirable to push an update to such network connected device at a random time. For example, it would be dangerous to push an update to a braking system in a vehicle while the vehicle is in operation. Even if the vehicle is stopped or if the engine is off, in some cases it may not be an appropriate time to make an update. For example, a vehicle may be at a weighing station or fueling station, and the pushing of the update may prevent the vehicle from leaving such station for an extended period of time, delaying other vehicles from being serviced at such station.

BRIEF DESCRIPTION OF THE DRAWINGS

The present disclosure will be better understood with reference to the drawings, in which.

DETAILED DESCRIPTION OF THE DRAWINGS

Figure 1:
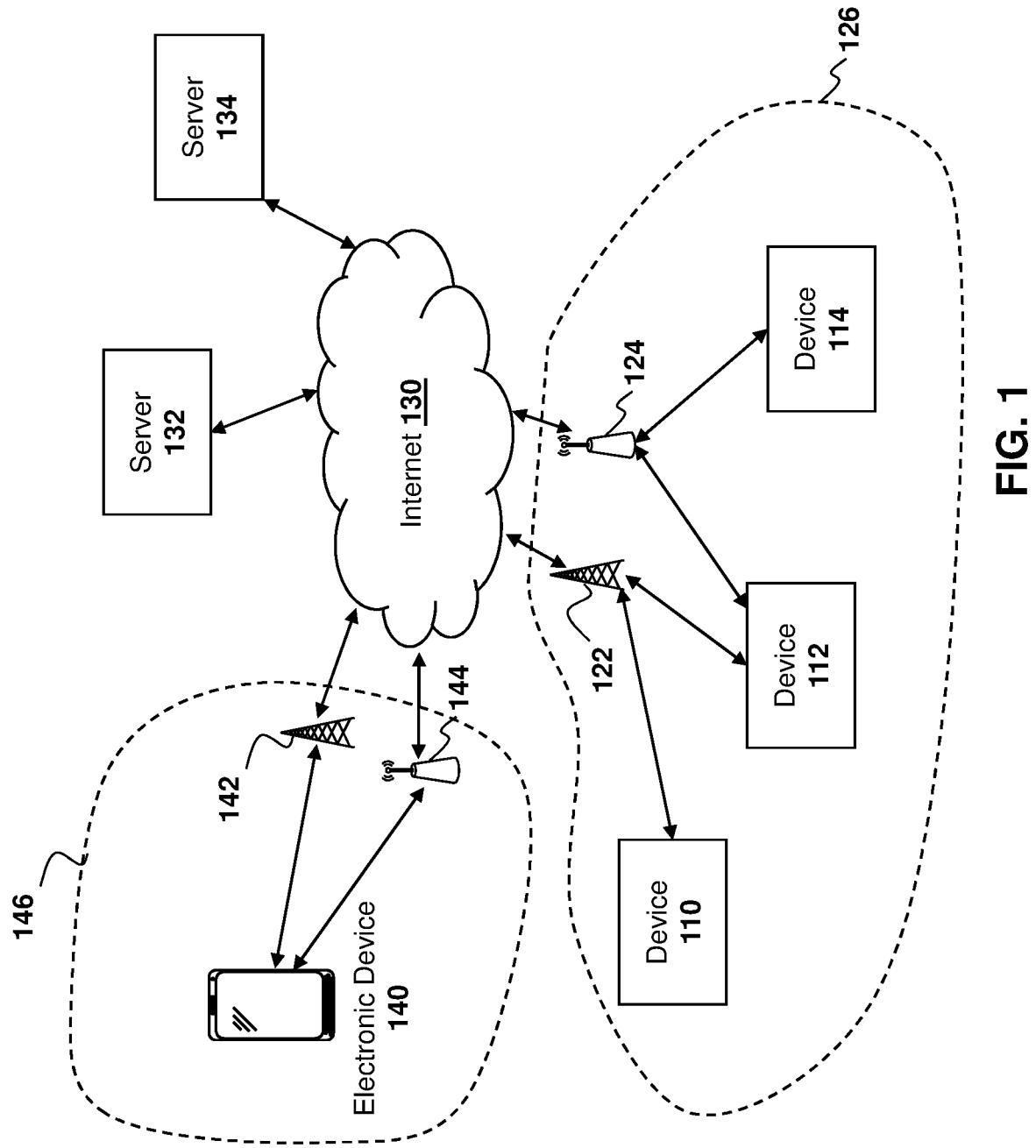
FIG. 1 is a block diagram showing an example architecture for a system in accordance with the embodiments of the present disclosure.

The present disclosure provides a method at a computing device acting as a switchboard between an electronic device and a device to be updated, the method comprising: receiving, at the computing device, a connection request from the electronic device, the connection request including an identifier for the device to be updated; receiving, at the computing device, a connection request from the device to be updated; associating, at the computing device, the connection request from the electronic device and the connection request from the device to be updated; forwarding, at the computing device, a message from the device to be updated to the electronic device that update conditions have been met; forwarding, at the computing device, a message from the electronic device to the device to be updated to start an update process; and forwarding, at the computing device, update status information from the device to be updated to the electronic device.

The present disclosure further provides a computing device configured to act as a switchboard between an electronic device and a device to be updated, the computing device comprising: a processor; and a communications subsystem, wherein the computing device is configured to: receive a connection request from the electronic device, the connection request including an identifier for the device to be updated; receive a connection request from the device to be updated; associate the connection request from the electronic device and the connection request from the device to be updated; forward a message from the device to be updated to the electronic device that update conditions have been met; forward a message from the electronic device to the device to be updated to start an update process; and forward update status information from the device to be updated to the electronic device.

The present disclosure further provides a computer readable medium for storing instruction code, which when executed by a processor of a computing device configured to act as a switchboard between an electronic device and a device to be updated, cause the computing device to: receive a connection request from the electronic device, the connection request including an identifier for the device to be updated; receive a connection request from the device to be updated; associate the connection request from the electronic device and the connection request from the device to be updated; forward a message from the device to be updated to the electronic device that update conditions have been met; forward a message from the electronic device to the device to be updated to start an update process; and forward update status information from the device to be updated to the electronic device.

Therefore, in accordance with the embodiments of present disclosure, methods and systems are provided for network connected devices that have no graphical user interfaces, but which have network interfaces, to have updates initiated and monitored through another electronic device. A network connected device, as used herein, may be any stationary or mobile computing device. For example, the device may be any device affixed to or part of shipping containers, truck trailers, or truck cabins in one embodiment. In other embodiments, the device may be affixed to or part or any vehicle, including motor vehicles (e.g. automobiles, cars, trucks, buses, motorcycles, etc.), aircraft (e.g. airplanes, unmanned aerial vehicles, unmanned aircraft systems, drones, helicopters, etc.), spacecraft (e.g. space planes, space shuttles, space capsules, space stations, satellites etc.), watercraft (e.g. ships, boats, hovercraft, submarines etc.), rail vehicles (e.g. trains and trams, etc.) and other types of vehicles including any combination of the foregoing, whether currently existing or after arising, among others.

In other cases, the network connected device may be a device such as an Internet of things (IOT) device, endpoints, home automation devices, medical equipment in hospital or home environments, inventory tracking devices, environmental monitoring devices, energy management devices, infrastructure management devices, vehicles or devices for vehicles, fixed electronic devices, among others.

The network connected device may connect, in some cases, to a network through another device. For example, the network connected device may be an ECU in a vehicle that communicates using a gateway in the vehicle to connect to, for example, a cellular network. Other options for such devices are possible.

Further the electronic device having a user interface may be any computing device, including a mobile device such as a cellular telephone, smartphone, internet appliance, laptop, desktop computer, smart watch, wearable, or other similar device.

While the embodiments of the present disclosure are provided below with regard to vehicle systems, the present disclosure is not limited to vehicle systems and any device having a network connection can be used with the embodiments of the present disclosure.

In the case of vehicles, the specific timing of an update cannot generally be inferred simply by observing the device state. For example, simply because a vehicle is not running and has the keys in the ignition, this does not imply that it is a good time for the vehicle to be updated. The vehicle could be at a gas pump, weighing station, among other scenarios, where the disabling of the vehicle for a time period to perform an update may be inappropriate.

Therefore, in accordance with the embodiments of the present disclosure, a user is allowed to initiate, via an electronic device, the update of a network connected device.

Further, in accordance with some embodiments of the present disclosure, a user may have difficulty identifying a specific device on which the update is to be performed. In such situation, a check that the appropriate device is being updated may be beneficial.

For example, when dealing with a fleet of vehicles such as trucks or rental vehicles, the person performing the update may have various vehicles to select from. Utilizing a vehicle identification number or other similar unique identifier, identification of the particular vehicle that the user wishes to update may occur. However, such system of selecting the vehicle may be error-prone and therefore, in accordance with embodiments described below, checks may be made to ensure that the correct vehicle is being updated.

Further, as described below, a network connected device may be on a different network than the electronic device being used for the update. For example, a network connected device may be secured on a private network. Many cellular carriers configure their networks utilizing private networks.

However, the electronic device may be on a different private network.

Given that there is no guarantee that the device and the electronic device are on the same private network, direct connectivity between the electronic device and the device being updated may be difficult.

Based on this, in accordance with the present disclosure, an intermediary server is provided, referred to herein as an over-the-air (OTA) switchboard. This server component is hosted in a manner that makes it available from the public internet and therefore both the device being updated and the electronic device can connect to such server.

In particular, reference is now made to FIG. 1, which shows a simplified architecture for a system in accordance with the present disclosure. In the embodiment of FIG. 1, a plurality of devices, namely devices 110, 112 and 114, communicate through a base station 122 or access point 124 to the Internet 130 or other similar network. As provided above, devices 110, 112, or 114 may be any device that needs to have software updates, and may, for example, be an ECU in a vehicle.

Communication may be with one or a plurality of the servers, such as servers 132 or 134 in the embodiment of FIG. 1. For example, server 132 may be an authentication server while server 134 may be an over-the-air switchboard server in one embodiment. However, in other embodiments, the functionality of servers 132 and 134 may be found on a single server.

An electronic device 140 communicates through a base station 142 or access point 144 with Internet 130, and may thereby communicate with servers 132 and 134.

As indicated above, the electronic device 140 and a network device such as device 110 may be on different private networks. For example, in the embodiment of FIG. 1, electronic device 140 is in a first private network 146 with a carrier and device 110 may be in a second private network 126, with the same or a different carrier.

Based on potentially being on different private networks, communication may occur between an electronic device 140 and a device 110 utilizing a server 132, as described in more detail below.

Utilizing a system as described with regard to FIG. 1 above, an update may occur based on a user receiving on an electronic device a notification that the vehicle or similar device to be updated has an update pending. Such update notification may be provided, for example, from an update server or other network element.

Figure 2:
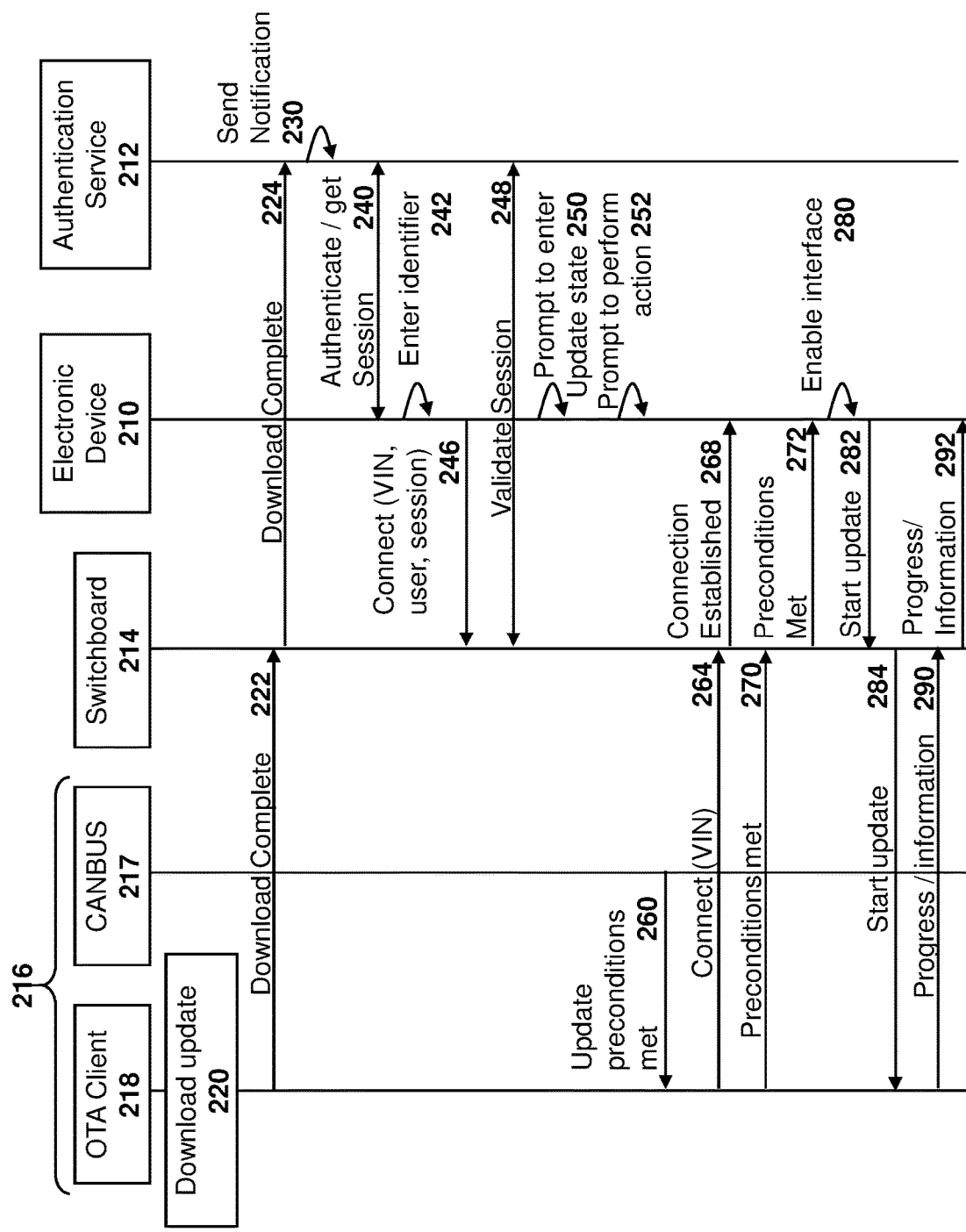
FIG. 2 is a data flow diagram showing the updating of a device using a switchboard and an electronic device.

Specifically, reference is now made to FIG. 2. In the embodiment of FIG. 2, an electronic device 210 may include software or an application for initiating and monitoring updates on a vehicle.

An authentication service 212 provides authentication for both the electronic device 210 as well as for vehicle communications, as described below.

Further, a switchboard 214 allows communication between the electronic device 210 and a vehicle.

The vehicle 216 includes internal communications between components or Electronic Control Units (ECU). Such internal communications may be based on any wired or wireless technology. The internal communications may allow for firmware or software for a component in the vehicle to be updated. In the example of FIG. 2, the internal communication is performed using CANBUS 217.

Further, vehicle 216 includes an over-the-air (OTA) client 218. The OTA client 218 provides for communication between the vehicle 216 and the switchboard 214.

In accordance with the embodiment of FIG. 2, a software update may be downloaded to a vehicle prior to the installation of such update. The update may be provided, for example, through switchboard 214 or directly from an update server (not shown). Such software update download is shown by block 220.

The download is however not installed at this point. The use of the pre-downloading of the update software allows installation of the software to occur more quickly once installation is started. Pre-downloading also ensures that a disruption in network communications will not impact installation times.

However, in other embodiments, the installation of the software may include downloading updates concurrently.

In the embodiment of FIG. 2, if the software update is pre-downloaded, then the OTA client 218 may send a download complete message 222 to the switchboard 214.

Switchboard 214 may then provide a download complete message 224 directly to an electronic device 210 in some embodiments. In other embodiments, the indication that the download is compete may be provided to a server such as to the authentication service 212 to provide a notification to the electronic device 210.

For example, in the embodiment of FIG. 2, the authentication service 212 may be used to provide a notification to the electronic device 210. In this regard, the authentication service may keep a list of electronic devices associated with the vehicle from which message 222 was sent, as relayed in message 224. However, this is not limiting and in other embodiments, different servers may be used to associated electronic devices to vehicles and send message 224.

In alternative embodiments in which pre-downloading does not occur, if a server has received an indication that an update is available, the server may keep a list or database of components installed in the various vehicles under its control. Therefore, the server may cross reference the update to a list of vehicles that need such update and then may further cross-reference to electronic devices associated with those vehicles.

Based on the association of the electronic device to the vehicle, the a server such as authentication service 212 may then send a message to the associated electronic device or devices, as shown with arrow 230 in the embodiment of FIG. 2.

One of such subscribed users may be the user of electronic device 210.

At some subsequent time when the installation of the update is appropriate, the user may then log in to a phone application or other software on electronic device 210 to initiate the installation of such software. In particular, in the embodiment of FIG. 2, the user may perform an authentication with the authentication service 212. A session identifier may be provided based on the authentication. The authentication is shown with arrow 240 in the embodiment of FIG. 2.

Once a user of the electronic device is authenticated with the authentication service 212, an identifier for the vehicle or device being upgraded may be entered. The identifier may be any number, code or designation that uniquely identifies the object being upgraded.

The identifier may be provided to the electronic device in various ways. For example, for a vehicle, the identification may be provided by manually entering a vehicle identification number, or by scanning a barcode or QR code in the vehicle.

In other embodiments, the identifier may be provided by clicking on a link in the message or notification received at arrow 230. For example, an Android intent can be used to define a link in an email that could then launch an application on an Android type system. Similar functionality could be performed on an iOS device or other operating system device.

In other embodiments, the identifier may be input utilizing a pre-stored list within the electronic device 210. For example, a user may be presented with a list of vehicle identifiers for vehicles associated with the electronic device 210, and a user may select an identifier from the list.

Other options for entering an identifier into electronic device 210 are possible, and the present disclosure is not limited to any method of providing the identifier to the electronic device.

The entering of the identifier is shown in the embodiment of FIG. 2 with arrow 242.

Subsequently, the electronic device 210 connects and communicates with switchboard 214 by sending a connect message 246. Connect message 246 may include various information. For example, in the embodiment of FIG. 2 the message includes the identifier entered at arrow 242, session information obtained at arrow 240, as well as user information. However, in other embodiments different information may be provided in the connect message 246.

The switchboard 214 may then validate the session received in message 246 with authentication service 212, as shown by arrow 248.

As will be appreciated by those in the art, the authentication service may be part of the switchboard 214, in which case, the validation at arrow 248 is internal. In this case, the session token may not be required to be sent from the electronic device.

Once the electronic device is connected to the switchboard 214, the electronic device may be prompted to have the user perform certain actions. For example, in the embodiment of FIG. 2, the electronic device may prompt a user to put the vehicle into an update state as shown by arrow 250. This may involve turning the engine off but having the key in a standby position, among other options. The present disclosure is not limited to any particular actions that need to be taken to put the vehicle into an update state.

The application or software on the electronic device may then prompt a user to perform an action which would not normally occur while the vehicle is in such update state. For example, in the embodiment of FIG. 2, the prompt may involve instructing a user to press and hold a button or combination of buttons available to a user on the vehicle. This shown with arrow 252 in the embodiment of FIG. 2.

In particular, the combination of actions at arrows 250 and 252 would typically not occur in the normal operation of the vehicle, thereby causing the vehicle to recognize that an update attempt is occurring. Specifically, in the embodiment of FIG. 2, the CANBUS 217 on the vehicle realizes that the update state has been entered and that the button or combinations of buttons is being pressed. Therefore, the CANBUS 217 sends message 260 to the OTA client 218 indicating that the update preconditions have been met.

The OTA client 218 may then connect to the switchboard 214 by sending a connect message 264 along with the identification number for the vehicle.

The switchboard 214 may provide a notification, as shown by message 268, to the electronic device 210 that a connection with the vehicle has been established.

Further, the OTA client 218 may inform the switchboard 214 that the update preconditions have been met, as shown by arrow 270. This may further be relayed by switchboard 214 to the electronic device 210, as shown with arrow 272.

The electronic device 210 may then enable a user interface to allow the updates to be started, as shown by arrow 280. For example, a "start" button may be enabled or become visible on the electronic device to allow the user to start the update.

If the user interface receives an input, such as pressing of a start button or other similar action to start the update, then the electronic device 210 may send a start command to switchboard 214, shown by message 282, which may then be relayed to the OTA client 218, shown by message 284.

Subsequently, the OTA client 218 cause the update to be started and may provide periodic status updates on the installation process to the switchboard 214, shown with arrow 290. Such status updates and progress reports may be relayed to the electronic device 210, as shown by arrow 292.

For example, during the update process, the OTA client 218 sends progress information including items such as percentage completed and remaining, as well as the overall outcome of the installation process, to the switchboard. The switchboard may then forward this information to the connected phone application or other element of the electronic device 210 to provide the user of the electronic device with such information.

In this way, the user of such electronic device will know the status of the update and when the update finishes.

Utilizing the embodiment of FIG. 2 above, various functionality is achieved. In particular, if the user is managing a fleet of devices, there is a need to ensure that the device identifier entered into the electronic device corresponds with the correct device to be updated. This is achieved based on the actions that are taken within the vehicle or other device being updated, along with interaction with the electronic device. The concurrent physical action on the device being updated and action on the electronic device ensures that the correct device is updated.

Further, the above embodiments prevent unintended updates. For example, if the electronic device initiates an update but no message is received from the vehicle, then the update process will not be started and the enablement of the "start" button will not occur. Further, if the vehicle indicates that the conditions for an update have been met but no electronic device has connected to try to do the update, then the switchboard may assume that such update preconditions were entered accidentally and no update is initiated.

In some embodiments, once the update process starts, it will proceed through to completion. This completion is either a successful completion or based on a roll back or failure of the software update. This ensures that even if the connection is lost to either the vehicle or the electronic device, that the update will continue.

In the above, security is provided through the fact that both the user of the electronic device needs to be authenticated to the authentication service, as well as the physical interaction with the device being updated. Thus, the combination of preconditions indicates that malicious updating of the vehicle is unlikely to occur. Further, the loading of the update itself may be done through a secure mechanism between the vehicle and an updated server.

With regard to the OTA switchboard 214, the switchboard may hold a list of vehicles and associated devices, and may simply forward messages from one to the other utilizing any messaging format. Thus, once the association between the device and the vehicle is established, over the OTA switchboard 214 merely acts as a conduit for forwarding messages between the two. For example, reference is now made to FIG. 3, which shows an association between the vehicle identification number data for a vehicle with a session owner user information from an electronic device.

Figure 3:
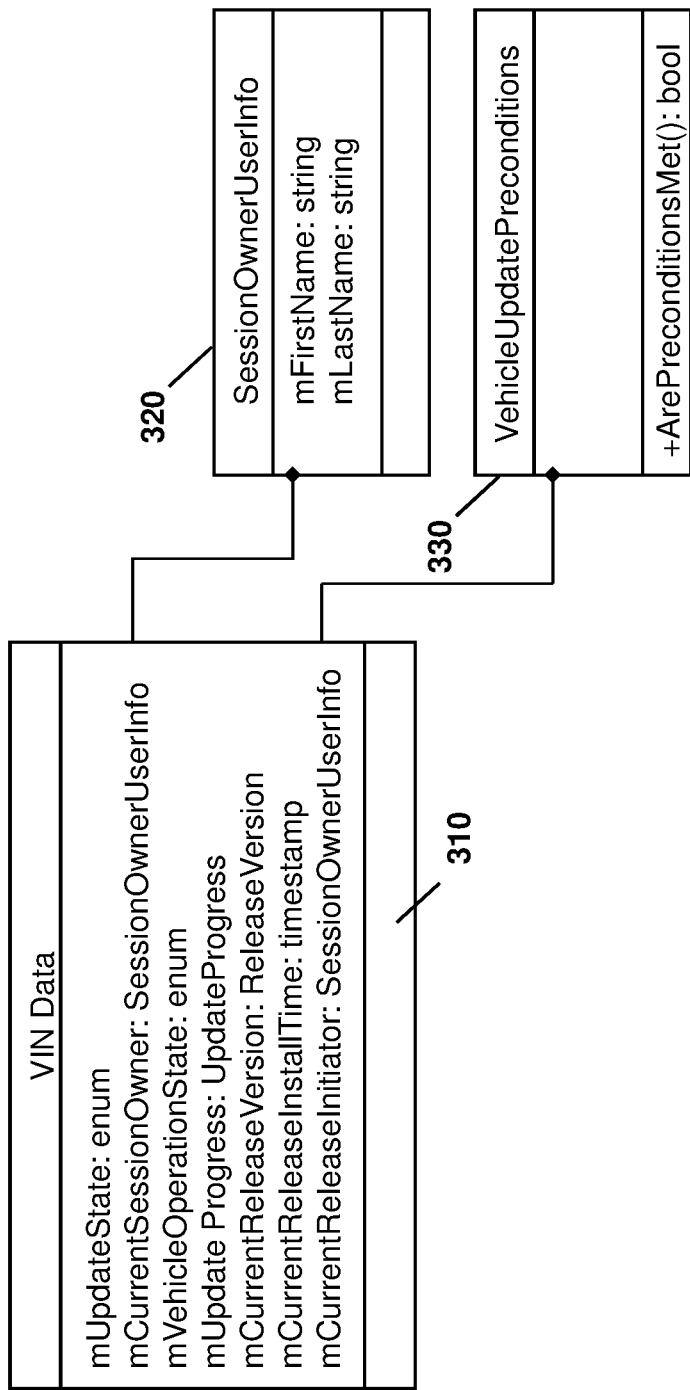
FIG. 3 is a block diagram showing data structures for associating an electronic device with a device to be updated.

In the embodiment of FIG. 3, the VIN data 310 may be associated with a plurality of states or variables, including an update state, the current session owner, the vehicle operational state, the update progress, the current release version, the current release install timestamp, and a release initiator.

The session owner user information 320 contains information identifying a user interacting with the remote OTA update control mechanism. For example, this may be an application on electronic device 210 from the embodiment of FIG. 2.

The vehicle update preconditions 330 may be a set of preconditions that are configured to indicate whether the vehicle is ready for updating. These conditions may involve, for example, putting the ignition key into a run position without turning on the engine and holding cruise control. Other options including setting the parking brake, among other options, for the vehicle update preconditions are however possible.

Based on FIGS. 1 to 3, a vehicle that does not have a feedback mechanism can be updated through the use of an electronic device such as a mobile phone and through the use of a server that may act as a switchboard for communications between the vehicle and the electronic device.

The device being updated or the electronic device may be any computing device. One simplified block diagram of a computing device is shown with regard to FIG. 4.

Figure 4:
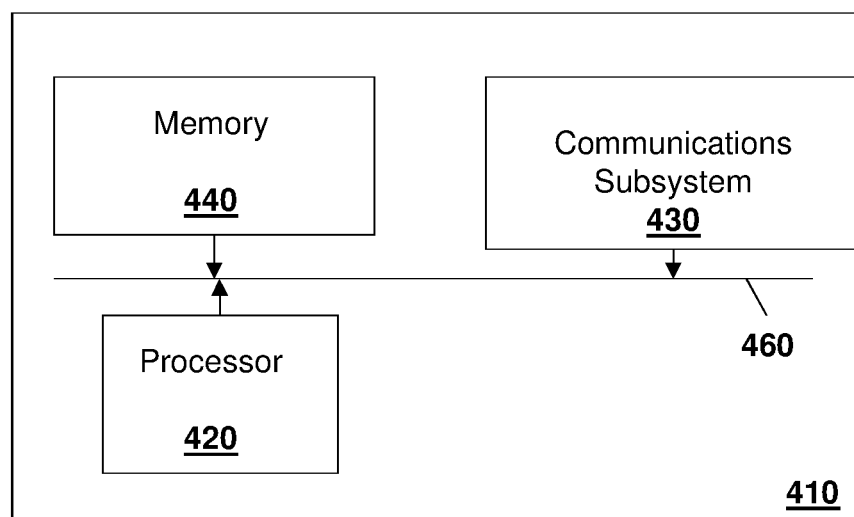
FIG. 4 is a block diagram of an example computing device capable of being used with the embodiments of the present disclosure.

In FIG. 4, computing device 410 includes a processor 420 and a communications subsystem 430, where the processor 420 and communications subsystem 430 cooperate to perform the methods of the embodiments described above. Communications subsystem 420 may, in some embodiments, comprise multiple subsystems, for example for different radio technologies.

Processor 420 is configured to execute programmable logic, which may be stored, along with data, on device 410, and shown in the example of FIG. 4 as memory 440. Memory 440 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 440, computing device 410 may access data or programmable logic from an external storage medium, for example through communications subsystem 430.

Communications subsystem 430 allows device 410 to communicate with other devices or network elements and may vary based on the type of communication being performed. For example, if computing device 410 is an ECU, communications subsystem 430 may be the interface to a CANBUS. If computing device 410 is a server or OTA client then communications subsystem 430 may include wired or wireless communications such as cellular, WiFi, ethernet, fiber, among other options. Further, communications subsystem 430 may comprise a plurality of communications technologies, including any wired or wireless communications technology.

Communications between the various elements of device 410 may be through an internal bus 460 in one embodiment. However, other forms of communication are possible.

The computing device of FIG. 4 could be any fixed or mobile device. If the computing device is a mobile device, one example mobile device is described below with regard to FIG. 5.

Mobile device 500 may comprise a two-way wireless communication device having voice or data communication capabilities or both. Mobile device 500 generally has the capability to communicate with other computer systems. Depending on the exact functionality provided, the mobile device may be referred to as a data messaging device, a two-way pager, a wireless e-mail device, a smartphone, a cellular telephone with data messaging capabilities, a wireless Internet appliance, a wireless device, a mobile device, an embedded cellular modem, an electronic device or a data communication device, as examples.

Where mobile device 500 is enabled for two-way communication, it may incorporate a communication subsystem 511, including a receiver 512 and a transmitter 514, as well as associated components such as one or more antenna elements 516 and 518, local oscillators (LOs) 513, and a processing module such as a digital signal processor (DSP) 520. As will be apparent to those skilled in the field of communications, the particular design of the communication subsystem 511 will be dependent upon the communication network in which the mobile device is intended to operate.

Network access requirements will also vary depending upon the type of network 519. In some networks, network access is associated with a subscriber or user of the mobile device 500. A mobile device may require an embedded or a removable user identity module (RUIM) or a subscriber identity module (SIM) card or a UMTS SIM (USIM) in order to operate on a network. The USIM/SIM/RUIM interface 544 is normally similar to a card-slot into which a USIM/SIM/RUIM card can be inserted and ejected. The USIM/SIM/RUIM card can have memory and hold many key configurations 551, and other information 553 such as identification, and subscriber related information.

Figure 5:
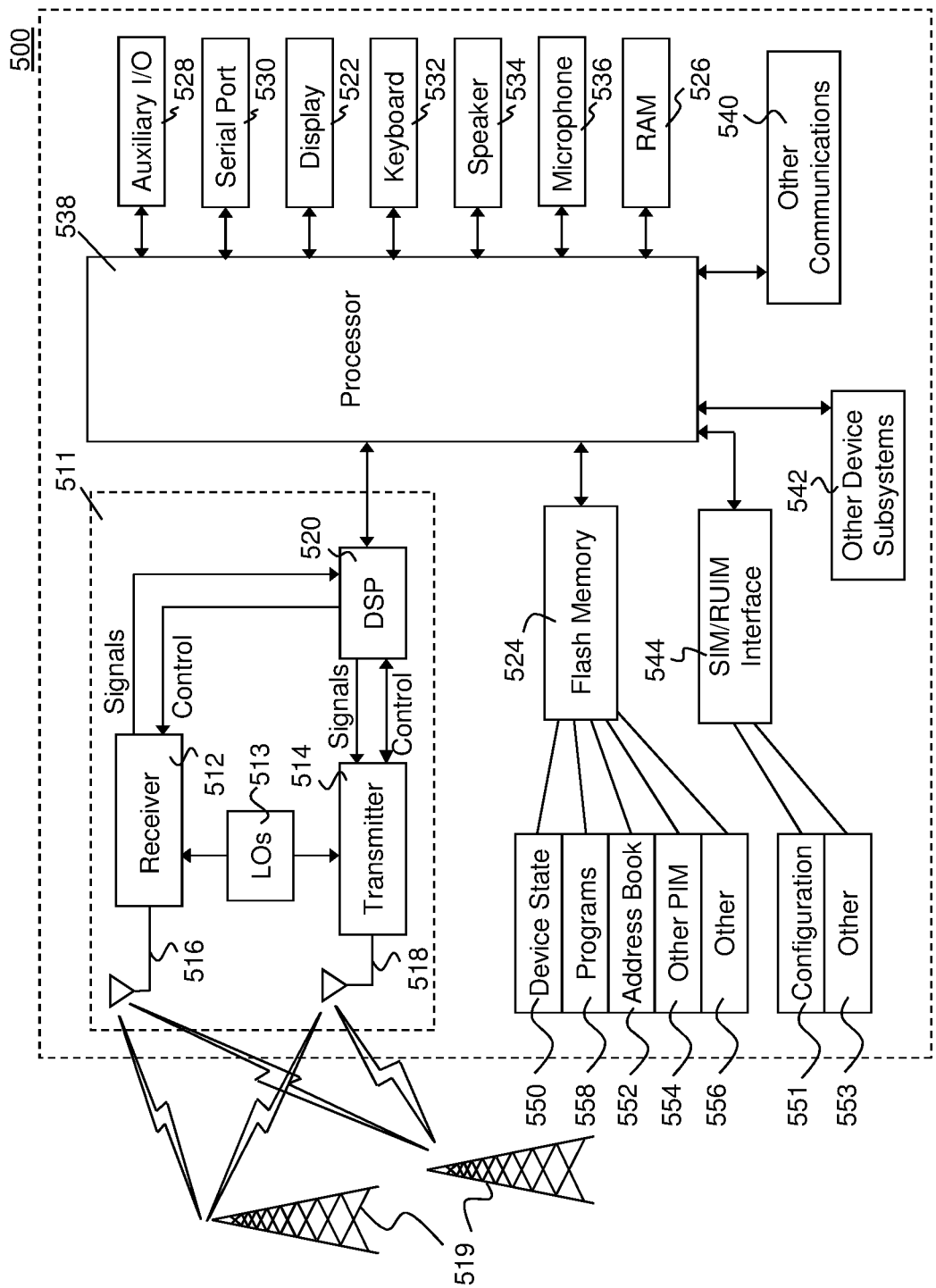
FIG. 5 is a block diagram of an example mobile device capable of being used with the embodiments of the present disclosure.

When required network registration or activation procedures have been completed, mobile device 500 may send and receive communication signals over the network 519. As illustrated in FIG. 5, network 519 can include multiple base stations communicating with the mobile device.

Signals received by antenna 516 through communication network 519 are input to receiver 512, which may perform such common receiver functions as signal amplification, frequency down conversion, filtering, channel selection and the like. Analog to digital (A/D) conversion of a received signal allows more complex communication functions such as demodulation and decoding to be performed in the DSP 520. In a similar manner, signals to be transmitted are processed, including modulation and encoding for example, by DSP 520 and input to transmitter 514 for digital to analog (D/A) conversion, frequency up conversion, filtering, amplification and transmission over the communication network 519 via antenna 518. DSP 520 not only processes communication signals, but also provides for receiver and transmitter control. For example, the gains applied to communication signals in receiver 512 and transmitter 514 may be adaptively controlled through automatic gain control algorithms implemented in DSP 520.

Mobile device 500 generally includes a processor 538 which controls the overall operation of the device. Communication functions, including data and voice communications, are performed through communication subsystem 511. Processor 538 also interacts with further device subsystems such as the display 522, flash memory 524, random access memory (RAM) 526, auxiliary input/output (I/O) subsystems 528, serial port 530, one or more keyboards or keypads 532, speaker 534, microphone 536, other communication subsystem 540 such as a short-range communications subsystem, DSRC subsystem 3GPP based V2X subsystem, or cellular subsystem, and any other device subsystems generally designated as 542. Serial port 530 could include a USB port, On-Board Diagnostics (OBD) port or other port known to those in the art.

Some of the subsystems shown in FIG. 5 perform communication-related functions, whereas other subsystems may provide "resident" or on-device functions. Notably, some subsystems, such as keyboard 532 and display 522, for example, may be used for both communication-related functions, such as entering a text message for transmission over a communication network, and device-resident functions such as a calculator or task list.

Operating system software used by the processor 538 may be stored in a persistent store such as flash memory 524, which may instead be a read-only memory (ROM) or similar storage element (not shown). Those skilled in the art will appreciate that the operating system, specific device applications, or parts thereof, may be temporarily loaded into a volatile memory such as RAM 526. Received communication signals may also be stored in RAM 526.

As shown, flash memory 524 can be segregated into different areas for both computer programs 558 and program data storage 550, 552, 554 and 556. These different storage types indicate that each program can allocate a portion of flash memory 524 for their own data storage requirements. Processor 538, in addition to its operating system functions, may enable execution of software applications on the mobile device. A predetermined set of applications that control basic operations, including potentially data and voice communication applications for example, will normally be installed on mobile device 500 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, messages, calendar events, voice mails, appointments, and task items. Further applications, including device update applications, productivity applications, social media applications, games, among others, may also be loaded onto the mobile device 500 through the network 519, an auxiliary I/O subsystem 528, serial port 530, short-range communications subsystem 540 or any other suitable subsystem 542, and installed by a user in the RAM 526 or a non-volatile store (not shown) for execution by the processor 538. Such flexibility in application installation increases the functionality of the device and may provide enhanced on-device functions, communication-related functions, or both.

In a data communication mode, a received signal such as a text message or web page download will be processed by the communication subsystem 511 and input to the processor 538, which may further process the received signal for output to the display 522, or alternatively to an auxiliary I/O device 528.

A user of mobile device 500 may also compose data items such as messages for example, using the keyboard 532, which may be a complete alphanumeric keyboard or telephone-type keypad, either physical or virtual, among others, in conjunction with the display 522 and possibly an auxiliary I/O device 528. Such composed items may then be transmitted over a communication network through the communication subsystem 511.

Where voice communications are provided, overall operation of mobile device 500 is similar, except that received signals may typically be output to a speaker 534 and signals for transmission may be generated by a microphone 536. Alternative voice or audio I/O subsystems, such as a voice message recording subsystem, may also be implemented on mobile device 500. Although voice or audio signal output is preferably accomplished primarily through the speaker 534, display 522 may also be used to provide an indication of the identity of a calling party, the duration of a voice call, or other voice call related information for example.

Serial port 530 in FIG. 5 may be implemented in a mobile device for which synchronization with a user's desktop computer (not shown) may be desirable, but is an optional device component. Such a port 530 may enable a user to set preferences through an external device or software application and may extend the capabilities of mobile device 500 by providing for information or software downloads to mobile device 500 other than through a wireless communication network. As will be appreciated by those skilled in the art, serial port 530 can further be used to connect the mobile device to a computer to act as a modem or for charging a battery on the mobile device.

Other communications subsystems 540, such as a short-range communications subsystem, is a further component which may provide for communication between mobile device 500 and different systems or devices, which need not necessarily be similar devices. For example, the subsystem 540 may include an infrared device and associated circuits and components or a Bluetooth™ or Bluetooth™ Low Energy communication module to provide for communication with similarly enabled systems and devices. Subsystem 540 may further include a DSRC radio or similar radio. Subsystem 540 may further include non-cellular communications such as Wi-Fi or WiMAX, or near field communications.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a network server acting as a switchboard between a wireless communications device, and a device to be updated, the method comprising:
   receiving, at the network server, a connection request from the wireless communications device, the connection request from the wireless communications device including a unique identifier;
   receiving, subsequent to the connection request from the wireless communications device, at the network server, a connection request from the device to be updated, the connection request from the device to be updated being based on the device to be updated being put into an update state, the connection request from the device to be updated further including the unique identifier;
   associating, at the network server, the connection request from the wireless communications device and the connection request from the device to be updated based on the unique identifier;
   receiving, at the network server, a first message from the device to be updated indicating that update conditions have been met, the update conditions comprising a physical authenticating interaction at the device to be updated while in the update state;
   transmitting, from the network server, the first message to the wireless communications device;

forwarding, at the network server, a second message from the wireless communications device to the device to be updated to start an update process; and forwarding, at the network server, update status information from the device to be updated to the wireless communications device.

2. The method of claim 1, wherein the device to be updated has no update feedback interface.

3. The method of claim 1, wherein the identifier is a vehicle identification number.

4. The method of claim 1, further comprising authenticating the connection request from the wireless communications device with an authentication service.

5. The method of claim 4, wherein the authenticating is based on a session identifier received in the connection request from the wireless communications device.

6. The method of claim 1, wherein at least one of the wireless communications device and device to be updated is on a private cellular network.

7. A network server configured to act as a switchboard between a wireless communications device and a device to be updated, the network server comprising:
   a processor; and
   a communications subsystem,
wherein the network server is configured to:
   receive a connection request from the wireless communications device, the connection request from the wireless communications device including a unique identifier;
   receive, subsequent to the connection request from the wireless communications device, a connection request from the device to be updated, the connection request from the device to be updated being based on the device to be updated being put into an update state, the connection request from the device to be updated further including the unique identifier;
   associate the connection request from the wireless communications device and the connection request from the device to be updated based on the unique identifier;
   receive, at the network server, a first message from the device to be updated indicating that update conditions have been met, the update conditions comprising a physical authenticating interaction at the device to be updated while in the update state;
   transmit, from the network server, the first message to the wireless communications device;
   forward a second message from the wireless communications device to the device to be updated to start an update process; and
   forward update status information from the device to be updated to the wireless communications device.

8. The network server of claim 7, wherein the device to be updated has no update feedback interface.

9. The network server of claim 7, wherein the identifier is a vehicle identification number.

10. The network server of claim 7, wherein the network server is further configured to authenticate the connection request from the wireless communications device with an authentication service.

11. The network server of claim 10, wherein the authentication is based on a session identifier received in the connection request from the wireless communications device.

12. The network server of claim 7, wherein at least one of the wireless communications device and device to be updated is on a private cellular network.

13. A non-transitory computer readable medium for storing instruction code, which when executed by a processor of a network server configured to act as a switchboard between a wireless communications device and a device to be updated, cause the network server to:
   receive a connection request from the wireless communications device, the connection request from the wireless communications device including a unique identifier;
   receive, subsequent to the connection request from the wireless communications device, a connection request from the device to be updated, the connection request from the device to be updated being based on the device to be updated being put into an update state, the connection request from the device to be updated further including the unique identifier;
   associate the connection request from the wireless communications device and the connection request from the device to be updated based on the unique identifier;
   receive, at the network server, a first message from the device to be updated indicating that update conditions have been met, the update conditions comprising a physical authenticating interaction at the device to be updated while in the update state;
   transmit, from the network server, the first message to the wireless communications device;
   forward a second message from the wireless communications device to the device to be updated to start an update process; and
   forward update status information from the device to be updated to the wireless communications device.

14. The computer readable medium of claim 13, wherein the device to be updated has no update feedback interface.

15. The computer readable medium of claim 13, wherein the identifier is a vehicle identification number.

16. The computer readable medium of claim 13, wherein the network server is further configured to authenticate the connection request from the wireless communications device with an authentication service.

17. The computer readable medium of claim 16, wherein the authentication is based on a session identifier received in the connection request from the wireless communications device.

* * * * *